United States Patent
Chipouras et al.

(10) Patent No.: US 11,112,260 B2
(45) Date of Patent: Sep. 7, 2021

(54) GEOSPATIAL NAVIGATION METHODS AND SYSTEMS FOR PROVIDING SELECTIVE VOICE GUIDANCE TO A USER OF A MOBILE NAVIGATION DEVICE

(71) Applicant: Verizon Patent and Licensing Inc., Arlington, VA (US)

(72) Inventors: John Chipouras, Denver, CO (US); Daniel Austin Kopyc, Denver, CO (US); Mark Husson, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 166 days.

(21) Appl. No.: 16/178,408

(22) Filed: Nov. 1, 2018

(65) Prior Publication Data
US 2020/0141756 A1 May 7, 2020

(51) Int. Cl.
*G01C 21/36* (2006.01)
*G01C 21/20* (2006.01)

(52) U.S. Cl.
CPC ......... *G01C 21/3641* (2013.01); *G01C 21/20* (2013.01); *G01C 21/3629* (2013.01)

(58) Field of Classification Search
CPC ............ G01C 21/3641; G01C 21/3484; G01C 21/3629; G01C 21/3453
See application file for complete search history.

(56) References Cited

U.S. PATENT DOCUMENTS

| | | | | |
|---|---|---|---|---|
| 2014/0100780 A1* | 4/2014 | Caine | ................. | G01C 21/3453 701/533 |
| 2015/0100231 A1* | 4/2015 | Weir | ................ | G08G 1/096872 701/400 |
| 2016/0076903 A1* | 3/2016 | Diaz | ................. | G01C 21/3415 701/468 |
| 2017/0307396 A1* | 10/2017 | So | ...................... | G01C 21/3484 |

* cited by examiner

*Primary Examiner* — Kenneth J Malkowski

(57) ABSTRACT

An exemplary geospatial navigation system defines geography of a domain of navigational proficiency of a user of a mobile navigation device. The geospatial navigation system receives, from the user, user input representative of a request to provide navigational guidance from a first location located within the geography of the domain of navigational proficiency of the user, to a second location located outside the geography of the domain of navigational proficiency of the user. In response, the geospatial navigation system provides the requested navigational guidance from the first to the second location to the user. Specifically, from the first location to a boundary point of the domain of navigational proficiency, the navigational guidance includes voice guidance provided at a diminished guidance level. Between the boundary point of the domain of navigational proficiency and the second location, the navigational guidance includes voice guidance provided at a comprehensive guidance level.

20 Claims, 8 Drawing Sheets

| Comprehensive Navigational Guidance | Diminished Navigational Guidance (Example 1) | Diminished Navigational Guidance (Example 2) |
|---|---|---|
| 1. Head east on AAA Cove<br>2. Turn left onto BBB Road<br>3. Turn right onto CCC Street<br>4. Fork left onto DDD Parkway<br>5. Turn left onto EEE Avenue<br>6. Merge onto FFF Highway, Northbound | 1. Head to FFF Highway and get on the highway going Northbound | 1. Head toward FFF Highway<br>2. Turn left<br>3. Turn right<br>4. Fork left<br>5. Turn left<br>6. Merge going Northbound |
| 7. Exit FFF Highway at GGG Way<br>8. Turn left at HHH Crossing<br>9. Turn right onto III Boulevard<br>10. Turn left onto JJJ Lane<br>11. Arrive at your destination: 1023 JJJ Lane | 2. Exit FFF Highway at GGG Way<br>3. Turn left at HHH Crossing<br>4. Turn right onto III Boulevard<br>5. Turn left onto JJJ Lane<br>6. Arrive at your destination: 1023 JJJ Lane | 7. Exit FFF Highway at GGG Way<br>8. Turn left at HHH Crossing<br>9. Turn right onto III Boulevard<br>10. Turn left onto JJJ Lane<br>11. Arrive at your destination: 1023 JJJ Lane |

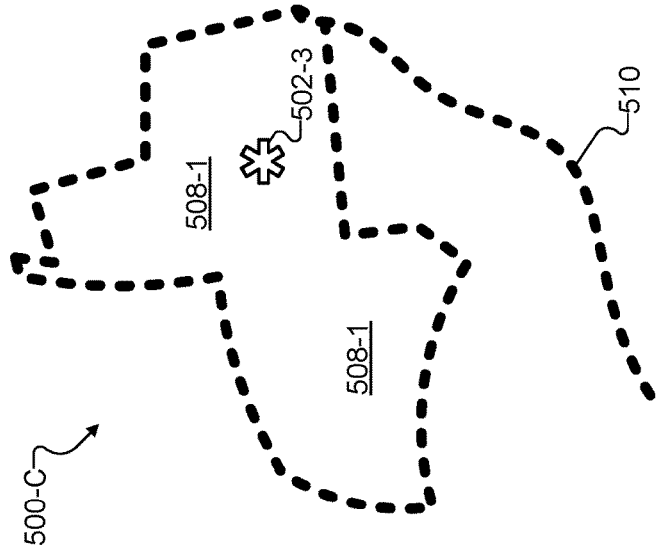
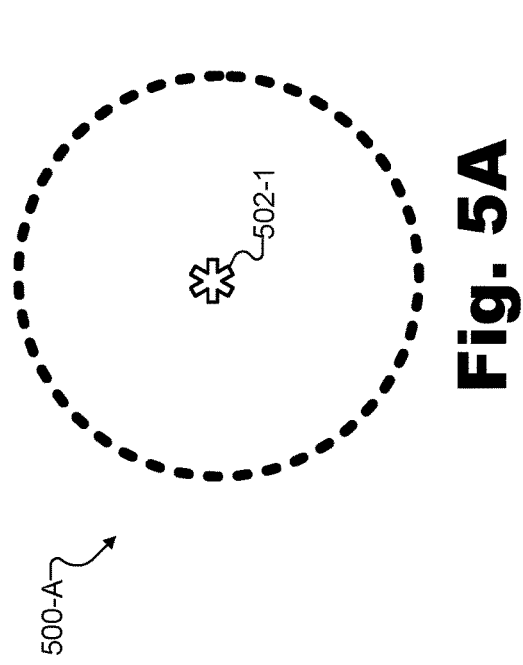
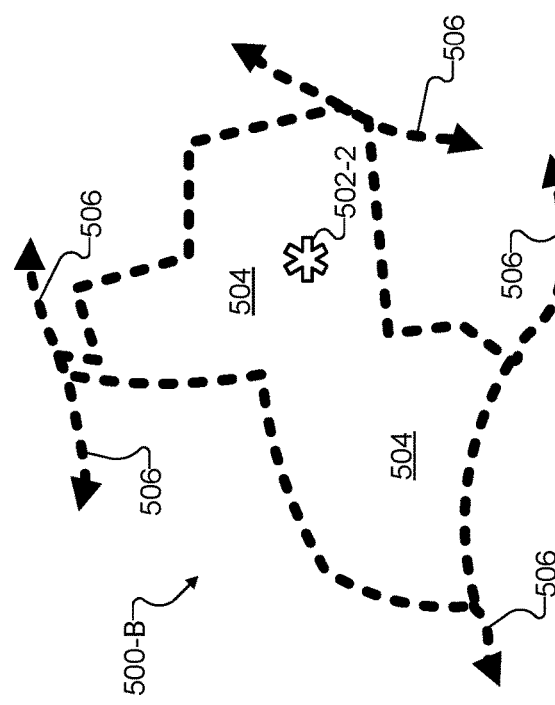

GEOSPATIAL NAVIGATION METHODS AND SYSTEMS FOR PROVIDING SELECTIVE VOICE GUIDANCE TO A USER OF A MOBILE NAVIGATION DEVICE

BACKGROUND INFORMATION

Use of mobile navigation devices has proliferated in recent years. For example, along with dedicated navigation devices (e.g., standalone navigation devices, dedicated navigation devices built into vehicles, etc.), general purpose mobile devices such as smartphones and tablet computers may also serve as mobile navigation devices by including hardware and/or software configured to provide location and navigation services.

In some examples, a user of a mobile navigation device may request guidance to navigate from one location to another. In response, the mobile navigation device may provide real-time, turn-by-turn instructions to assist the user in navigating a route between the locations. Such instructions may be provided in a variety of ways, but it may be difficult, inconvenient, or otherwise undesirable in certain situations for the user to view the instructions by way of a screen of the mobile navigation device (e.g., graphically, textually, etc.). For example, if a user is driving, it may be undesirable for the user to take his or her eyes off the road to study a map or textual instruction. As a result, certain geospatial navigation systems provide voice guidance instructing the user about each navigational step that is to be taken to arrive at the destination.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 5A-5C illustrate additional and alternative geographical aspects that may characterize various exemplary domains of navigational proficiency of a user according to principles described herein.

DETAILED DESCRIPTION OF PREFERRED EMBODIMENTS

Figure 1:
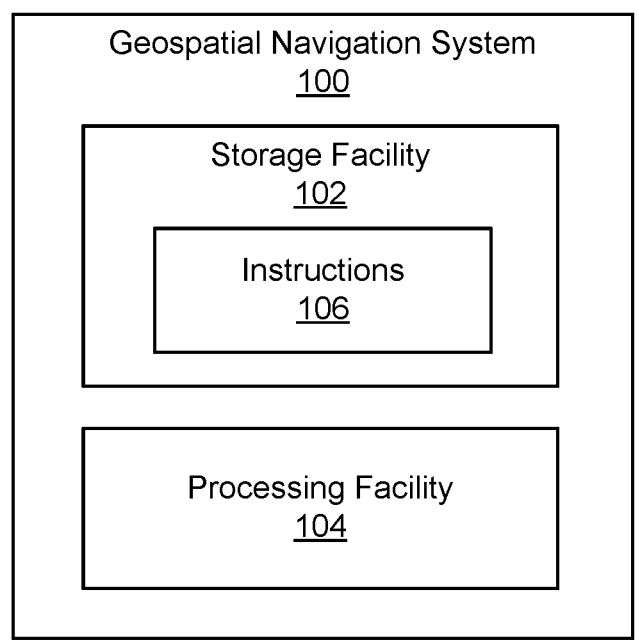
FIG. 1 illustrates an exemplary geospatial navigation system for providing selective voice guidance to a user of a mobile navigation device according to principles described herein.

Methods and systems for providing selective voice guidance to a user of a mobile navigation device are described herein. As described above, it may be desirable, particularly in circumstances where it is inconvenient or otherwise undesirable for a user to view a screen, for a mobile navigation device to provide navigational guidance by way of voice guidance. However, as will be described in more detail below, as helpful as voice guidance can be in certain situations, voice guidance may also be perceived by users as redundant, unnecessary, and even irritating in other situations. For instance, it may be undesirable for detailed, turn-by-turn voice instructions to be relayed (e.g., thereby interrupting other audio or conversations a user may wish to listen to) if a user is navigating a familiar segment of a route in a familiar area. A user may well know, for example, how to get to a particular highway entrance near his or her home without turn-by-turn instructions for how to navigate through his or her neighborhood and over to the highway. Similarly, when returning home from an unfamiliar place, the user may appreciate assistance navigating from the unfamiliar place onto a familiar highway, but may not need or want to be verbally instructed thereafter (e.g., when to exit the highway, how to navigate from the highway exit back home, etc.).

To this end, geospatial navigation methods and systems described herein provide selective voice guidance to facilitate convenient navigation while reducing unnecessary and/or annoying voice guidance as a user navigates a route that includes segments the user is already familiar with. For example, an exemplary mobile navigation device may be configured to define geography of a domain of navigational proficiency of a user of a mobile navigation device. This geography may include, for instance, geographical areas, locations and points of interest, paths (e.g., streets, trails, etc.), boundary points (e.g., highway entry points and exit points, etc.), and so forth with which the user has experience and familiarity. A such, the geospatial navigation system may determine that the user is navigationally proficient with this geography and define it to be included in a domain of navigational proficiency of the user.

The geospatial navigation system may receive, from the user, user input representative of a request to provide navigational guidance from a first location to a second location. The first location may be located within the geography of the domain of navigational proficiency of the user (e.g., in a geography that is familiar to the user). In contrast, the second location may be located outside the geography of the domain of navigational proficiency of the user (e.g., in a geography that is at least somewhat unfamiliar to the user).

In response to receiving the request from the user, the geospatial navigation system may provide the user the requested navigational guidance from the first location to the second location. However, as described above, rather than providing comprehensive voice guidance along the entire route, the geospatial navigation system may provide selective voice guidance, including a combination of comprehensive and diminished voice guidance, in accordance with what the user is familiar with (or proficient at navigating) as defined by the domain of navigational proficiency. For example, the navigational guidance provided by the geospatial navigation system may include voice guidance that is provided at a diminished guidance level from the first location to a boundary point of the domain of navigational proficiency of the user, and that is provided at a comprehensive guidance level from the boundary point of the domain of navigational proficiency of the user to the second location.

Additionally, as will be described in more detail below, the geospatial navigation system may provide requested navigational guidance from a location in an unfamiliar place outside of the domain of navigational proficiency to a familiar location within the domain of navigational proficiency. Here again, in these examples, the geospatial navigation system may provide selective voice guidance in accordance with the domain of navigational proficiency (as opposed to, for instance, providing comprehensive voice guidance along the entire route). For example, the navigational guidance provided by the geospatial navigation system may include voice guidance that is provided at a comprehensive guidance level from the location in the unfamiliar place to a boundary point of the domain of navigational proficiency of the user, and that is provided at a diminished guidance level from the boundary point of the domain of navigational proficiency of the user to the final destination in the familiar location.

Geospatial navigation methods and systems described herein for providing selective voice guidance may provide various advantages and benefits over conventional geospatial navigation technology.

In certain conventional examples, geospatial navigation systems provide navigational guidance for an entire route with just one guidance level (e.g., a comprehensive guidance level). As described above, however, while such comprehensive guidance may be helpful and desirable for certain segments of a particular route, it may feel to the user to be excessive and unwelcome for other segments. This may be particularly true for voice guidance provided by the geospatial navigation system. Unlike textual and graphical guidance, which may be ignored relatively easily when not being relied upon (e.g., the user does not have to look at the screen if such guidance is not desired), voice guidance can demand the user's attention and be more difficult to ignore. For example, the voice guidance may interrupt conversations the user is engaged in or media content the user is listening to. This may be only mildly disruptive in some cases (e.g., if the media content includes music that is not interrupted) but could be highly distracting in others (e.g., if the media content includes spoken-word programming such as a podcast, talk radio, audiobook, etc.). While such interruptions may be acceptable and desirable when the user is unfamiliar with an area in which he or she is navigating (e.g., to prevent the user from missing a turn, etc.), the interruptions may be irritating and undesirable when the user is familiar with the area (e.g., in which case the user may be planning to make the turn anyway without guidance). For example, when the user is navigating in the vicinity of a central user location such as his or her home, office, school, or the like, the user may be very comfortable with navigating between the central user location and a highway entrance/exit point. As such, it may be annoying to the user for voice guidance to announce each and every step of how to navigate to and from the highway every time the user does so.

In other conventional examples, these problems may be partially addressed by systems configured to cease providing any navigational guidance once a route comes within a predetermined distance of a predesignated location (e.g., a specific location that has been designated by the user as a "home" location). Such features still leave room for improvement, however. For instance, even if a user is navigating towards home, he or she may still benefit from some level of guidance (albeit a diminished level). Moreover, even if a user of such conventional systems is not annoyed with extraneous instructions when returning to a predesignated "home" location, the user may still be inconvenienced when navigating to other familiar (yet undesignated) locations, when navigating from the predesignated home location to other locations, and so forth.

Fortunately, the geospatial navigation methods and systems described herein help reduce, minimize, and/or prevent such annoyances and inconveniences by providing selective voice guidance to the user. More specifically, the geospatial navigation methods and systems described herein may be configured to intelligently and automatically determine geography of a domain of navigational proficiency with which the user seems to be familiar and/or within which the user has demonstrated proficiency in navigating without assistance. Based on this determination, the systems described herein may offer voice and/or other types of navigational guidance within this domain at a diminished guidance level (e.g., no guidance, abbreviated guidance, lower volume or intensity guidance, differently styled guidance, etc.), while still providing full comprehensive guidance elsewhere. In this way, geospatial navigation methods and systems described herein may help provide a more pleasant and effective navigational experience for users because the experience includes fewer interruptions, is less likely to be tuned out by the user, and so forth. At the same time, systems and methods described herein may provide such selective navigational guidance to the user without compromising the ultimate objective of facilitating the user in effectively navigating to a destination.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary geospatial navigation system 100 ("system 100"). As shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation.

Storage facility 102 may maintain (e.g., store) executable data used by processing facility 104 to perform any of the functionality described herein. For example, storage facility 102 may store instructions 106 that may be executed by processing facility 104 to perform any of the functionality described herein. Instructions 106 may be implemented by any suitable application, software, code, and/or other executable data instance. Storage facility 102 may also maintain any data received, generated, managed, used, and/or or transmitted by processing facility 104.

Processing facility 104 may be configured to perform (e.g., execute instructions 106 stored in storage facility 102 to perform) various processing functions associated with providing selective voice guidance to a user of a mobile navigation device. For example, processing facility 104 may define geography of a domain of navigational proficiency of a user of a mobile navigation device that may fully or partially implement system 100, or may be communicatively coupled to system 100 if implemented separately.

Processing facility 104 may further receive user input from the user. For example, the user input may be representative of a request to provide navigational guidance between a first location and a second location, where the first location is located within the geography of the domain of navigational proficiency of the user and the second location is located outside the geography of the domain of navigational proficiency of the user. In response, processing facility 104 may provide the requested navigational guidance between the first and second locations to the user. However, rather than providing full and comprehensive navigational guidance of various types (e.g., voice, textual, graphical, etc.), processing facility 104 may provide selective navigational guidance. In particular, processing facility 104 may provide the user selective voice guidance provided 1) at a diminished guidance level between the first location and a boundary point of the domain of navigational proficiency of the user, and 2) at a comprehensive guidance level between the boundary point of the domain of navigational proficiency of the user and the second location.

In some implementations, system 100 (e.g., processing facility 104) may be configured to provide selective voice guidance to a user of a mobile navigation device in real time. As used herein, a function may be said to be performed in real time when the function relates to or is based on dynamic, time-sensitive information and the function is performed while the time-sensitive information remains accurate or otherwise relevant. Due to processing times, communication latency, and other inherent delays in physical systems, certain functions may be considered to be performed in real time when performed immediately and without undue delay, even if performed after small delay (e.g., a delay up to a few seconds or the like).

Figure 2:
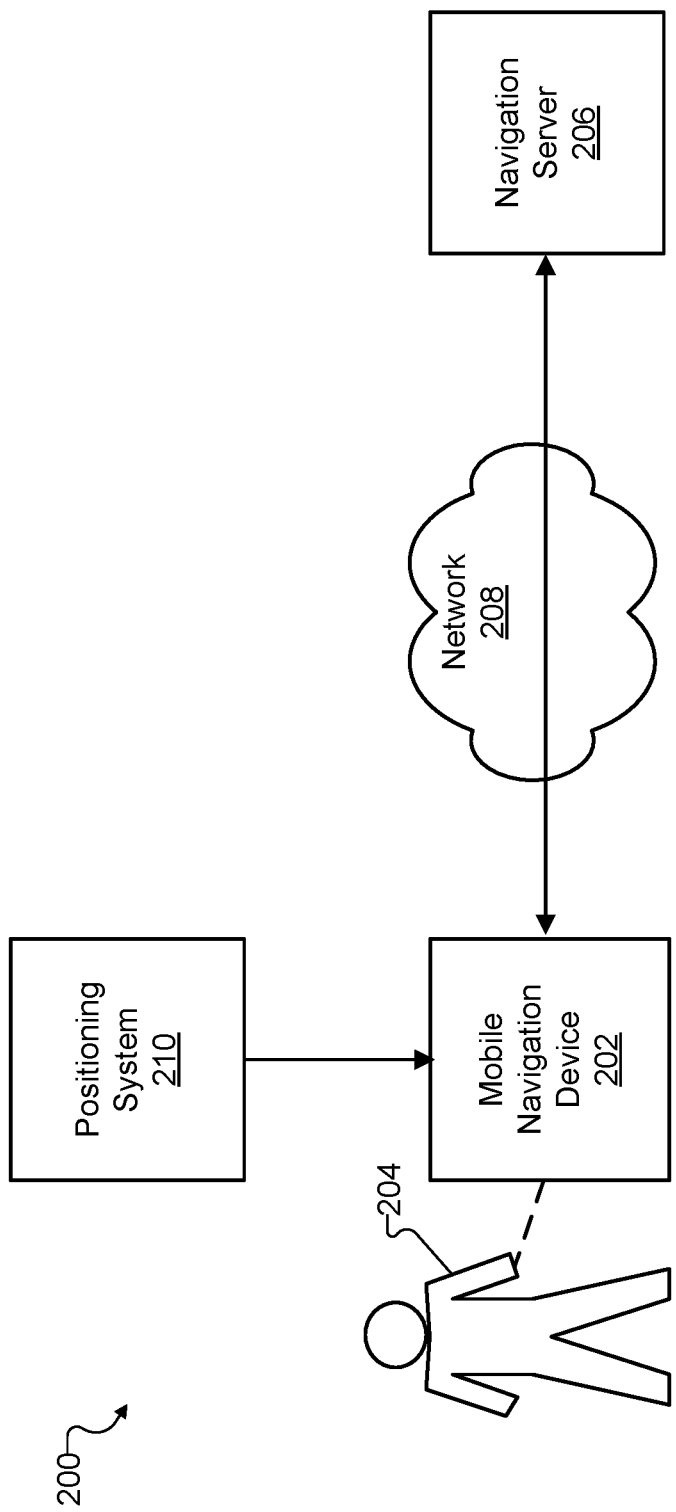
FIG. 2 illustrates an exemplary configuration in which the geospatial navigation system of FIG. 1 may operate to provide selective voice guidance to a user of a mobile navigation device according to principles described herein.

FIG. 2 illustrates an exemplary configuration 200 in which system 100 may operate to provide selective voice guidance to a user of a mobile navigation device. As shown in configuration 200, a mobile navigation device 202 being used by a user 204 is communicatively coupled with a navigation server 206 by way of a network 208. Mobile navigation device 202 also is communicatively coupled to a positioning system 210 that is shown to provide information to mobile navigation device 202 directly.

Mobile navigation device 202 may be implemented as any type of mobile device that includes hardware and/or software configured to perform navigation services described herein such as executing a geospatial navigation application, performing real-time tracking of a geolocation of mobile navigation device 202, providing user 204 navigational guidance (e.g., including providing selective voice guidance), communicating with navigation server 206 and/or positioning system 210, and so forth. For example, mobile navigation device 202 may be implemented by a mobile phone (e.g., a smartphone), a tablet device, a dedicated navigational device (e.g., a portable navigation device, a device permanently integrated with a vehicle, etc.), a laptop computer, or the like.

Navigation server 206 may be implemented by one or more servers or other computing systems operated by a navigation service provider, a cellular network service provider, or the like. Navigation server 206 may store data representative of geography (e.g., maps, etc.), points of interest, user preferences, usage histories (e.g., search histories, tracked movements of mobile navigation device 202, etc.), and/or any other data as may be useful for implementing navigational services and/or any of the operations described herein. In particular, navigation server 206 may be used to store large amounts of data associated not only with a single mobile navigation device or location, but with multiple mobile navigation devices (e.g., thousands of mobile navigation devices used by thousands of subscribers, etc.), multiple locations (e.g., nationwide or global locations, etc.), or the like.

Network 208 may facilitate data delivery between server-side systems such as navigation server 206 and client-side systems such as mobile navigation device 202 in a server-client data delivery architecture illustrated by configuration 200. As such, network 208 may include a wireless local area network (e.g., a Wi-Fi network), a provider-specific wired or wireless network (e.g., a cable or satellite carrier network, a mobile telephone network, etc.), the Internet, a wide area network, a content delivery network, and/or any other suitable network or networks. Data may be distributed using any suitable communication technologies included within network 208. As such, data may flow between navigation server 206 and mobile navigation device 202 using any communication technologies, devices, media, and protocols as may serve a particular implementation.

Positioning system 210 may be implemented as one or more satellites or other suitable data sources that provide, directly to mobile navigation device 202, information from which mobile navigation device 202 may derive a geolocation (e.g., its own current geolocation). For example, positioning system 210 may represent the Global Positioning System ("GPS") operated by the United States or a similar satellite-based or non-satellite-based positioning system operated by another country or entity. In some examples, positioning system 210 may further include terrestrial-based enhancement or correction data to make raw satellite-based positioning more accurate. For instance, positioning system 210 may generate and provide real-time kinematic ("RTK") signaling to enhance the precision of satellite-based signaling received by the GPS or other such systems. Data received from positioning system 210, when analyzed and processed by mobile navigation device 202 and/or other mobile navigation devices, may facilitate the real-time derivation of geolocation information such as the current geolocation of the mobile navigation devices.

System 100 may operate within and be implemented by configuration 200 in any suitable way. For instance, system 100 may be fully implemented by mobile navigation device 202, fully implemented by navigation server 206, distributed between (i.e., partially implemented by each of) mobile navigation device 202 and navigation server 206, distributed across other elements illustrated in configuration 200 or other suitable elements not explicitly shown, or otherwise implemented in any manner as may serve a particular implementation.

As one example, system 100 may be implemented, in full or in part, by navigation server 206, which may store some or all of the data of storage facility 102 (e.g., including data specific to user 204 as well as data for additional users associated with additional mobile navigation devices not explicitly shown). In such examples, navigation server 206 may store geospatial navigation application software that navigation server 206 may provide to mobile navigation device 202 for download and installation by mobile navigation device 202. By providing such software, navigation server 206 may be said to direct mobile navigation device 202 to perform the operations included within the software instructions.

As another example, system 100 may be fully or partially implemented by mobile navigation device 202. In certain implementations, for instance, mobile navigation device 202 may directly perform operations described above for system 100 (e.g., defining geography of a domain of navigational proficiency, receiving a user request, and providing navigational guidance including selective voice guidance, etc.), but, in doing so, may employ at least some information stored within databases managed by navigation server 206 and/or provided by positioning system 210.

User 204 may carry and use mobile navigation device 202 for any suitable purpose (e.g., work, recreation, navigation, etc.). In certain examples, mobile navigation device 202 is implemented as a personal mobile device (e.g., a smartphone, etc.) that the user generally carries with them (e.g., keeps nearby) throughout the day and night. As used herein, a user may be said to "carry" a mobile navigation device when actively using the mobile navigation device, passively keeping the mobile navigation device on his or her person (e.g., in a pocket, purse, briefcase, etc.), or otherwise keeping the mobile navigation device nearby (e.g., setting the device on a desk in the user's work area during work hours, charging the device within the home while the user is asleep, temporarily mounting the device on a dashboard while the user is driving, etc.). In other examples, mobile navigation device 202 is implemented as an integrated mobile device that is built into or semi-permanently attached to a vehicle (e.g., semi-permanently mounted on a dashboard of the vehicle, etc.), or is implemented in other suitable ways.

Regardless of whether mobile navigation device 202 is a personal mobile device carried by user 204 or is more permanently associated with a vehicle used by user 204, the motion of mobile navigation device 202 may serve as a proxy for the motion of user 204. For example, as will be described in more detail below, if mobile navigation device 202 is tracked and determined to spend a certain amount of time at one location (e.g., a workplace), to then travel to and spend another amount of time at another location (e.g., a gym), and to then travel to and spend the night at a third location (e.g., a residence), system 100 may be configured to assume that user 204 has likewise traveled to and spent time at these locations. As will be described in more detail, system 100 may, in this way, observe various behaviors of user 204 and, over time, define a highly accurate and useful domain of navigational proficiency for the user that may be used to provide selective voice guidance to the user in the ways described herein.

In some example, a mobile device tracked to help define a domain of navigational proficiency for the user may be different from the mobile navigation device used by the user to provide the navigational guidance. For instance, system 100 may track a personal mobile device carried by the user to accurately determine where the user spends time, what geography the user appears to be familiar with or proficient at navigating, and so forth. Tracking data collected in this manner may then be used to define geography of a domain of navigational proficiency for the user, and data representative of such geography may be provided to a vehicle-integrated mobile navigation device that the user uses to request and receive navigational guidance in the ways described herein.

Figure 3:
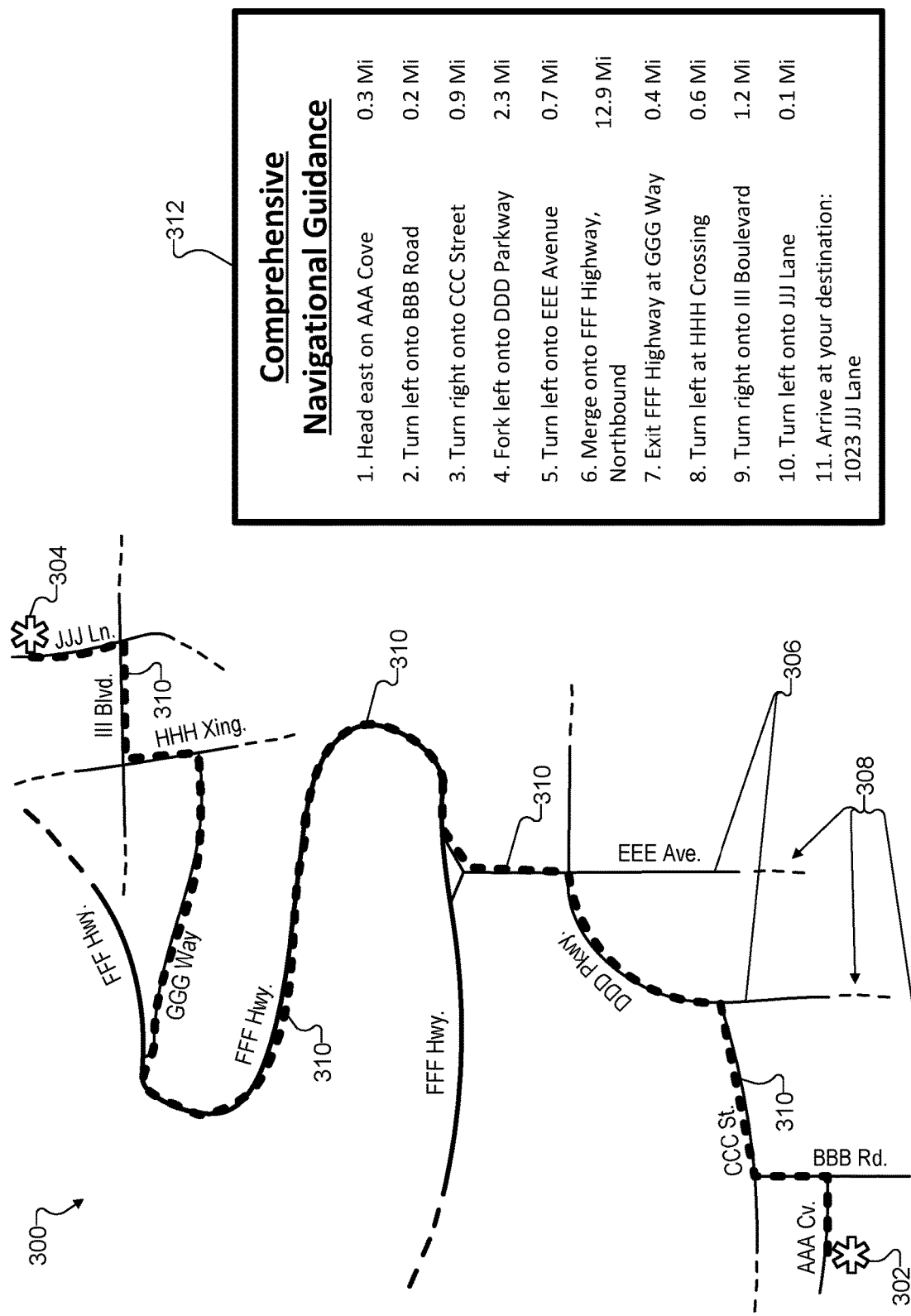
FIG. 3A illustrates an exemplary route between a first location and a second location along a set of different paths according to principles described herein.
FIG. 3B illustrates exemplary comprehensive navigational guidance associated with the route of FIG. 3A according to principles described herein.

To illustrate how mobile navigation device 202 may provide requested navigational guidance to user 204, FIG. 3A shows an exemplary route between a first location and a second location along a set of different paths. Specifically, FIG. 3A depicts a map 300 that includes a location 302 and a location 304 that are connected by various segments of a series of different paths 306.

Locations 302 and 304 may represent any suitable locations, including locations of particular points of interest. For example, points of interest at locations 302 and/or 304 may include homes or residences, offices or other workplaces, restaurants or other such establishments, retail stores or other places of business, public properties such as libraries or parks, neighborhoods, churches, or any other entities associated with particular geographical locations and that may be of interest to users. In some examples, locations 302 and/or 304 may be singular locations such as may be defined by a street address or a set of coordinates (e.g., longitudinal and latitudinal coordinates). In the same or other examples, locations 302 and/or 304 may refer to geographical areas such as neighborhoods or other regions, municipalities (e.g., cities, towns, etc.), territories (e.g., counties, states, countries, etc.), or the like.

In some examples, one of locations 302 or 304 may be located within a domain of navigational proficiency of user 204, while the other location may be located external to the domain of navigational proficiency. For instance, in various examples described in more detail below, location 302 and the paths 306 in its vicinity may be located within a domain of navigational proficiency of user 204, while location 304 and paths 306 in its vicinity may be located external to the domain of navigational proficiency.

As used herein, a "path" may refer to any type of road, street, thoroughfare, highway, etc., upon which motorized vehicles may drive, or may be another type of path such as a foot path, a bicycle route, a walking trail, a public transport line (e.g., a train line, a bus line, etc.), or any other course or way upon which user 204 may travel (e.g., whether using some type of vehicle or not). For example, map 300 depicts paths including "AAA Cv.," "BBB Rd.," "CCC St.," "DDD Pkwy.," "EEE Ave.," "FFF Hwy.," "GGG Way," "HHH Xing.," "III Blvd.," and "JJJ Ln.," all of which will be understood to be streets upon which a motor vehicle such as a car may drive. It will be understood that, as shown in FIG. 3A, paths 306 are not drawn to scale and do not generally depict paths in their entirety. Rather, for clarity of illustration, relevant segments of each path 306 are shown with ellipsis symbols 308 drawn as applicable to indicate that the respective path continues on in a manner not explicitly shown on the representation of map 300 in FIG. 3A.

A route 310 depicted as a thick dotted line traversing various segments of paths 306 is shown to connect locations 302 and 304. As shown, route 310 covers or includes various paths 306 (or segments thereof) to go between location 302 and 304. As used herein, a route or navigational guidance that is said to go "between" two locations may involve both a starting location and a destination location, but does not dictate or imply which location is which. For example, if there is a route between a first and a second location, either the first or the second location may be understood to be the starting location (with the other location being the destination location) unless more information is given to indicate which location is which. Similarly, navigational guidance between the first and second locations may refer to either navigational guidance from the first location to the second location, or navigational guidance from the second location to the first location.

Route 310 may be generated based on a request received from user 204. For instance, user 204 may provide user input representative of a request for mobile navigation device 202 to provide navigational guidance between locations 302 and 304 in any suitable way. In one example, for instance, user 204 may explicitly input an address or point of interest to which user 204 wishes to discover a route to from his or her current location. In other examples, user 204 may input two or more such addresses or points of interest and direct mobile navigation device 202 to provide navigational guidance between them. In some examples, rather than directly inputting specific addresses or points of interest, user 204 may request navigational guidance from mobile navigation device 202 in other ways. For instance, user 204 may use a digital assistant or voice-command interface to request the navigational guidance (e.g., asking "How do I get home?" or "How do I get to the nearest gas station?"). As another example, the user may request the navigational guidance by selecting a user preference setting that allows mobile navigation device 202 to automatically attempt to determine and anticipate where user 204 may want to navigate to based on previously observed behavior. For example, if such a setting is selected, mobile navigation device 202 may automatically determine that user 204 has requested navigational guidance to drive home after work at 5:00 PM on a weekday if that is something that the user has habitually requested directly.

Once mobile navigation device 202 has determined and/or defined route 310 between locations 302 and 304, mobile navigation device 202 may provide navigational guidance to user 204 relating, step-by-step, how user 204 is to navigate from location 302 to location 304 (or vice versa). To illustrate, FIG. 3B illustrates exemplary comprehensive navigational guidance 312 associated with route 310. Specifically, as shown, comprehensive navigational guidance 312 includes a plurality of instructions numbered 1 through 11 that are configured to guide user 204 from location 302 to location 304. It will be understood that, in other examples, comprehensive navigational guidance 312 could instead include instructions to guide user 204 from location 304 to location 302. Additionally, along with such turn-by-turn instructions, comprehensive navigational guidance 312 may also incorporate other useful information (e.g., real-time, updated information) such as traffic updates (e.g., indicating accidents or other traffic issues on the route), estimated time of arrival ("ETA") updates, rerouting suggestions, and so forth.

As used herein, "comprehensive" navigational guidance will be understood to refer to navigational guidance at a guidance level that is relatively full, all-inclusive, thorough, and/or conspicuous (e.g., attention-grabbing) compared to "diminished" navigational guidance, which may be noticeably less full, less inclusive, less thorough, and/or less conspicuous. Accordingly, the level of detail, inclusiveness, or conspicuousness of navigational guidance provided at a "comprehensive guidance level" is not implied herein to have any particular characteristic or level. Rather, these things are to be understood in relation to the distinct characteristics and levels of detail, inclusiveness, and/or conspicuousness of navigational guidance provided at a "diminished guidance level," examples of which will be described in more detail below. While absolute levels of guidance detail, inclusiveness, and/or conspicuousness may thus change from implementation to implementation, comprehensive navigational guidance may always be appreciably more detailed, inclusive, and/or conspicuous than diminished navigational guidance for a particular implementation.

As shown, comprehensive navigational guidance 312 in FIG. 3B includes a set of complete, turn-by-turn, instructions. Specifically, instruction 1 indicates that user 304 is to "head east on AAA Cove" for 0.3 miles. Instruction 2 indicates that user 304 is to "turn left onto BBB Road" and continue on BBB Road for 0.2 miles. Instruction 3 indicates that user 304 is to "turn right onto CCC Street" and continue on CCC Street for 0.9 miles. Instruction 4 indicates that user 304 is to "fork left onto DDD Parkway" and continue on DDD Parkway for 2.3 miles. Instruction 5 indicates that user 304 is to "turn left onto EEE Avenue" and continue on EEE Avenue for 0.7 miles. Instruction 6 indicates that user 304 is to "merge onto FFF Highway, Northbound" and continue on FFF Highway Northbound for 12.9 miles. Instruction 7 indicates that user 304 is to "exit FFF Highway at GGG Way" and continue on GGG Way for 0.4 miles. Instruction 8 indicates that user 304 is to "turn left onto HHH Crossing" and continue on HHH Crossing for 0.6 miles. Instruction 9 indicates that user 304 is to "turn right onto III Boulevard" and continue on III Boulevard for 1.2 miles. Instruction 10 indicates that user 304 is to "turn left onto JJJ Lane" and continue on JJJ Lane for 0.1 miles. Finally, instruction 11 indicates that user 304 will arrive at his or her destination (i.e., at 1023 JJJ Lane).

While comprehensive navigational guidance 312 includes instructions that will be considered comprehensive in certain situations (e.g., in relation to certain more abbreviated sets of instructions as will be described below), it will be understood, as described above, that the comprehensiveness of comprehensive navigational guidance 312 is relative. As such, in certain examples, the instructions of comprehensive navigational guidance 312 may include further instructions not shown. For instance, comprehensive navigational guidance 312 may include multiple notifications prior to a turn, inclusion of multiple different names for certain paths 306 (e.g., paths with a common name and a formal highway number, etc.), periodic instructions to continue straight on a long stretch of highway, or various other guidance not explicitly shown in FIG. 3B as may serve a particular implementation.

As described above, it may not always be desirable for all forms of navigational guidance (e.g., voice guidance, textual guidance, graphical guidance, haptic guidance, etc.) to be provided at a comprehensive guidance level. In particular, voice guidance may be distracting or annoying in certain situations (e.g., including some situations described above) if user 204 is already familiar with a portion of the route. Accordingly, it may be desirable in certain examples for system 100 to determine a domain of navigational proficiency for user 204, and to relay guidance instructions related to this domain of navigational proficiency at a diminished guidance level. For example, voice guidance instructions relating to portions of route 310 included within the domain of navigational proficiency may not be provided at all, may be provided less conspicuously (e.g., at a lower volume level, without interrupting other audio, etc.), or may be provided with less detail.

As used herein, geography of a domain of navigational proficiency may refer to geography (e.g., paths, locations, path entry points or exit points, contiguous zones or areas of land, etc.) within which a user has demonstrated a certain degree of familiarity. Accordingly, within such geography, system 100 may employ a working assumption that the user is capable of proficiently navigating without comprehensive navigational guidance.

Figure 4:
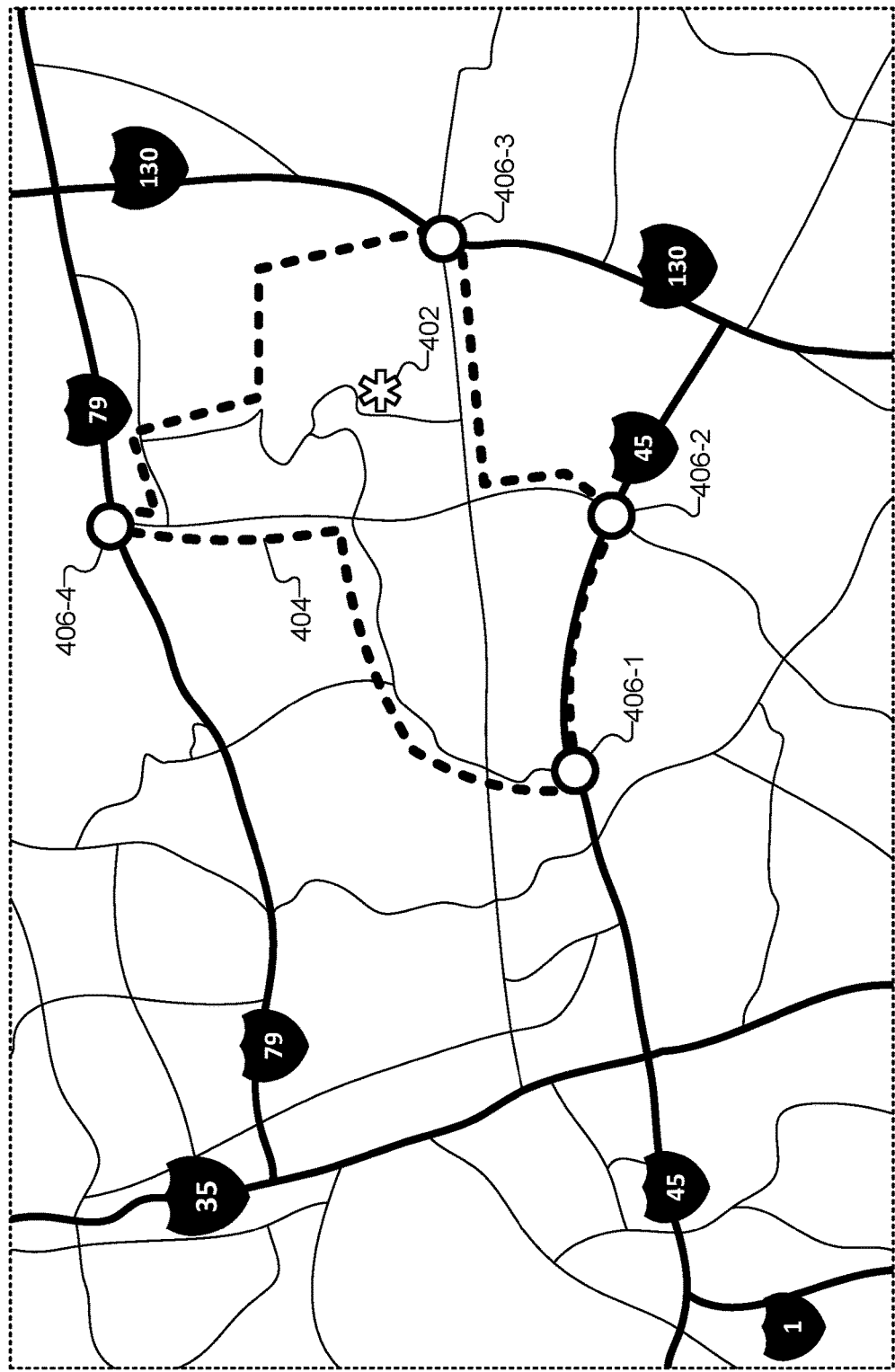
FIG. 4 illustrates a map depicting exemplary geography of a domain of navigational proficiency of a user of a mobile navigation device according to principles described herein.

To illustrate, FIG. 4 shows a map 400 depicting exemplary geography of a domain of navigational proficiency of user 204 of mobile navigation device 202. Specifically, map 400 shows a central user location 402 (e.g., a home, workplace, school, etc., of user 204) that is situated within a domain of navigational proficiency 404 ("domain 404"). In this example, domain 404 is implemented as a contiguous zone of familiarity surrounding central user location 402. Domain 404 is also shown to include several boundary points 406 (i.e., boundary points 406-1 through 406-4) where domain 404 intersects major paths. Specifically, boundary points 406-1 and 406-2 are each located along the boundary of domain 404 at respective entry/exit points of a Highway 45, boundary point 406-3 is located along the boundary of domain 404 at an entry/exit point of a Highway 130, and boundary point 406-4 is located along the boundary of domain 404 at an entry/exit point of a Highway 79.

As illustrated by domain 404, certain domains of navigational proficiency may include a central user location (e.g., central user location 402) and a zone of familiarity in the vicinity of the central user location. The zone of familiarity may be an area that includes locations that user 204 frequently visits, spends time at, passes through, etc., while excluding other areas that are not so frequently visited or traveled through. As such, the zone of familiarity may take an irregular shape based on the geography of the area (e.g., where paths such as highways are built), the preferences and habits of user 204, and so forth. A domain of navigational proficiency such as domain 404 may be defined in any suitable way and based on any suitable data. For example, system 100 may define domain 404 by performing operations such as determining a position of central user location 402, determining the zone of familiarity around central user location 402 that user 204 appears to be proficient in, determining key boundary points 406 (e.g., entry points/exit points on major paths, etc.) associated with the zone of familiarity, and so forth.

System 100 may perform these or other operations based on data such as express user input (i.e., user input entered by the user when explicitly prompted) and/or tracking data automatically collected and derived based on observations of user behavior. For example, in some implementations, system 100 may prompt user 204 for a home address, a work address, a school address, a preferred route between central user locations in which user 204 spends large amounts of time, and/or other such data. Additionally or alternatively, system 100 may track mobile navigation device 202 during an extended time period as user 204 carries mobile navigation device 202 or, as another example, as mobile navigation device 202 remains attached to a vehicle driven by user 204. In these examples, system 100 may define the geography of domain 404 of user 204 based on tracking data collected during the tracking of mobile navigation device 202.

In these examples where system 100 tracks mobile navigation device 202 to determine the tracking data, it will be understood that the tracking may be performed over an extended period of time such as for several days, weeks, months, or even longer, and may be performed only with consent of user 204 and in accordance with privacy laws and preferences of user 204. In certain examples, device tracking may be performed at intermittent update rates (e.g., on the order of every few minutes or more, rather than every second or less) to allow for minimal (e.g., negligible) battery usage, minimal network data usage, and so forth. Additionally, device tracking may be performed by a background process that runs continuously so that mobile navigation device 202 may be kept track of even if a particular application (e.g., a geospatial navigation application associated with providing the navigational guidance) is not currently executing on mobile navigation device 202. In this way, a comprehensive profile of user 204 may be generated that may reliably predict where user 204 lives, works, attends school or other daily activities, and so forth. Additionally, based on tracking data representative of the extended time period, system 100 may reliably determine which geography (e.g., in the vicinity of the home or workplace of user 204 or elsewhere) user 204 is proficient in navigating.

In some examples, the extended time period over which mobile navigation device 202 is tracked may be a continuous, ongoing time period. For example, even after an initial domain of navigational proficiency is determined, system 100 may continue to monitor movements of mobile navigation device 202 and make adjustments to the domain of navigational proficiency accordingly. In these examples, system 100 may thus perform the defining of the domain of navigational proficiency as a continuous and evolving process involving both 1) initializing (e.g., at an initial point in time) the geography of the domain of navigational proficiency, and 2) repeatedly updating (e.g., subsequent to the initial point in time and during the extended time period) the initialized geography of the domain of navigational proficiency based on the tracking data. In some examples, this repeated updating may be performed based on feedback received from the user such as if the user reenables voice guidance manually after it has been automatically diminished. Deterministic rules, artificial intelligence, machine learning, or other suitable technologies may be employed to effectively implement such feedback and to continuously refine and improve domain 404 over time.

In examples in which domain 404 is based on tracking mobile navigation device 202, it may be desirable for system 100 to distinguish geography user 204 is actually familiar with from geography that user 204 has merely visited once or twice, has passed through, etc., but with which user 204 is not particularly familiar. To this end, system 100 may be configured to monitor and account for various aspects of user behavior based on tracking data collected from mobile navigation device 202.

As one example, system 100 may not only track where one particular geospatial navigation application (e.g., a geospatial navigation application partially implementing system 100) is used to guide user 204, but may further track where other geospatial navigation applications are used to guide user 204, as well as where user 204 navigates to and spends time when not using the assistance of a geospatial navigation application.

Additionally or alternatively, system 100 may distinguish geography familiar to the user from other geography in various other ways. System 100 may distinguish geography that user 204 has traveled through from geography at which user 204 has dwelled for a more significant amount of time (and thus is more likely to be familiar with). Similarly, system 100 may distinguish geography where user 204 has dwelled once or twice from geography where user 204 habitually spends time and is more likely to know more intimately. For example, if system 100 determines that user 204 has dwelled at a particular location for at least ten hours a day everyday for several weeks, system 100 may reliably predict that this particular location is a home of user 204, or at least is a place that user 204 is intimately familiar with. Other similar determinations may further increase a confidence in such predictions. Because most people tend to go home at night to sleep, for example, system 100 may predict that a location is a home (i.e., residence) of user 204 if user 204 spends time there overnight for a certain number of nights (e.g., 20 nights within a month, etc.), for a certain number of consecutive nights (e.g., 10 nights in a row, etc.), or the like.

As yet another example of how system 100 may identify familiar geography to be defined as part of domain, system 100 may account for how often user 204 tends to visit locations in the neighborhood of central user location 402 (e.g., other points of interest in the vicinity of central user location 402 such as restaurants, stores, residences, schools, etc.). For example, even if user 204 is detected to spend several hours a day at a central user location identified as a workplace, it may be the case that user 204 merely drives to and from the location by way of a particular route, and, outside of that route, may not necessarily be particularly familiar with the neighborhood around the workplace. System 100 may account for this by tracking not only that user 204 spends significant time at the workplace, but also that user 204 rarely visits any other points of interest in the vicinity of the workplace.

As yet another example of how system 100 may identify familiar geography to be defined as part of domain 404, system 100 may account for whether and to what extent user 204 relies on navigational guidance to navigate to certain locations. For example, system 100 may determine that particular geography that user 204 visits often is familiar if user 204 rarely or never uses assistance or guidance to navigate to or within that geography. If, on the other hand, user 204 habitually uses navigational guidance for most or all travel, system 100 may or may not interpret that as a sign that user 204 is unfamiliar with the geography. For example, it may be the case that user 204 employs navigational guidance not so much for turn-by-turn instruction information but for other information such as for ETA estimates, traffic updates, or the like. However, even in these examples, if user 204 employs navigational guidance to navigate to locations that are relatively nearby (e.g., such that it is unlikely that the navigational guidance is actually employed not for the directions but for the ETA estimates or traffic updates), system 100 may still determine that the area is not particularly familiar to user 204 and should not be included in domain 404.

While domain 404 illustrates one particular type of domain of navigational proficiency, it will be understood that domain 404 is exemplary only, and other types of domains of navigational proficiency may be implemented in other implementations. To illustrate, FIGS. 5A-5C illustrate additional and alternative geographical aspects that may characterize various exemplary domains of navigational proficiency of a user in certain implementations.

As a first example, FIG. 5A shows a domain of navigational proficiency 500-A ("domain 500-A") implemented as a circle around a central user location 502-1 (e.g., a home, workplace, etc., of user 204, similar to central user location 402). Domain 500-A may be defined based on user input received directly from user 204 (e.g., based on prompts to the user), rather than based on any tracking data or observance of user behavior. For example, system 100 may prompt user 204 to enter his or her home address which, when located on a map, may be designated as central user location 502-1. Based on central user location 502-1, system 100 may define domain 500-A as a circular area within a particular radius (e.g., 2 miles, etc.) of central user location 502-1. In other examples, rather than a circular area, system 100 may define a square area (e.g., a certain number of city blocks on each side), a rectangular area, an area of another predetermined shape, an irregular shape that is bounded by the nearest major highway entry/exit points to central user location 502-1, or the like.

As another example, the geography of a domain of navigational proficiency may include a contiguous zone of familiarity situated around a central user location (e.g., similar to the zone of familiarity situated around central user location 402 in domain 404), as well as an entirety of one or more paths that intersect the zone of familiarity and extends beyond the zone of familiarity. To illustrate, FIG. 5B depicts one example of this type of domain of navigational proficiency. In FIG. 5B, a domain of navigational proficiency 500-B ("domain 500-B") is shown to include a central user location 502-2 situated within a contiguous zone of familiarity 504 that looks similar to domain 404. However, unlike domain 404, domain 500-B is shown to further include the entirety of various paths 506 (e.g., Highway 45, Highway 130, and Highway 79, as illustrated on map 400). By including not only zone of familiarity 504 geography but also path 506 geography in domain 500-B, system 100 may provide an implementation with a relatively wide reach. For example, if user 204 is hundreds of miles from home in an unfamiliar place, but is guided to merge onto a highway (e.g., one of paths 506) that happens to lead all the way back to domain 500-B, system 100 may provide diminished, rather than comprehensive, voice guidance starting from that point hundreds of miles away, rather than beginning to provide the diminished voice guidance only once user 402 gets closer to home. Similarly, if user 204 requests to navigate to a faraway location but will spend most of the trip on a path 506 that is included within domain 500-B, system 100 may provided diminished, rather than comprehensive, voice guidance for the majority of the trip until user 204 nears the destination and is guided to exit the path 506.

As yet another example, the geography of a domain of navigational proficiency may include multiple non-contiguous zones of familiarity that are connected by one or more paths. To illustrate, FIG. 5C depicts one example of such a domain of navigational proficiency. In FIG. 5C, a domain of navigational proficiency 500-C ("domain 500-C") is shown to include a central user location 502-3 situated within a first zone of familiarity 508-1 that looks similar to domains 404 and 500-B. However, unlike domains 404 and 500-B, domain 500-C is shown to further include another central user location 502-4 situated within a second zone of familiarity 508-2, and at least a segment of a path 510 that connects non-contiguous zones of familiarity 508-1 and 508-2. For example, central user location 502-3 may represent a residence where user 204 lives and central user location 502-4 may represent a workplace where user 204 works. As such, system 100 may not only provide diminished navigational guidance based on one zone of familiarity, but may provide diminished navigational guidance based on both zones of familiarity 508-1 and 508-2. For example, if user 204 is at home within zone of familiarity 508-1 and requests navigational guidance to a point of interest near or within zone of familiarity 508-2, system 100 may provide diminished navigational guidance not from a boundary point of zone of navigation 508-1 (e.g., where user 204 would get onto path 510), but, rather, from a boundary point of zone of navigation 508-2. For example, the first instruction provided may indicate that user 204 should navigate to his or her workplace at central user location 502-4 (or to a familiar nearby location), and comprehensive navigational guidance may be provided thereafter.

As mentioned above, system 100 may account for the domain of navigational proficiency when providing navigational guidance. For example, as described previously, system 100 may provide comprehensive navigational guidance between a first location and a boundary point of the domain of navigational proficiency, and may provide diminished navigational guidance between a second location and the boundary point. Referring back to FIGS. 3A and 3B, for instance, an example may be considered in which: 1) location 302 is a starting location that is within a domain of navigational proficiency; 2) location 304 is a destination external to the domain of navigational proficiency; 3) the geography of the domain of navigational proficiency includes the segments of each of paths 306 traversed by route 310 up to and including FFF Highway, and 4) the domain of navigational proficiency excludes other geography including the segments of each of paths 306 traversed by route 310 after FFF Highway. More specifically, the geography of the domain of navigational proficiency includes the depicted segments of AAA Cove, BBB Road, CCC Street, DDD Parkway, EEE Avenue, and FFF Highway, while excluding the depicted segments of GGG Way, HHH Crossing, III Boulevard, and JJJ Lane.

In this example, it may be desirable for system 100 to provide diminished voice guidance from location 302 to FFF Highway (i.e., while user 204 navigates within the geography of the domain of navigational proficiency), and for system 100 to provide comprehensive voice guidance thereafter (i.e., while user 204 navigates beyond the geography of the domain of navigational proficiency).

Figure 6:
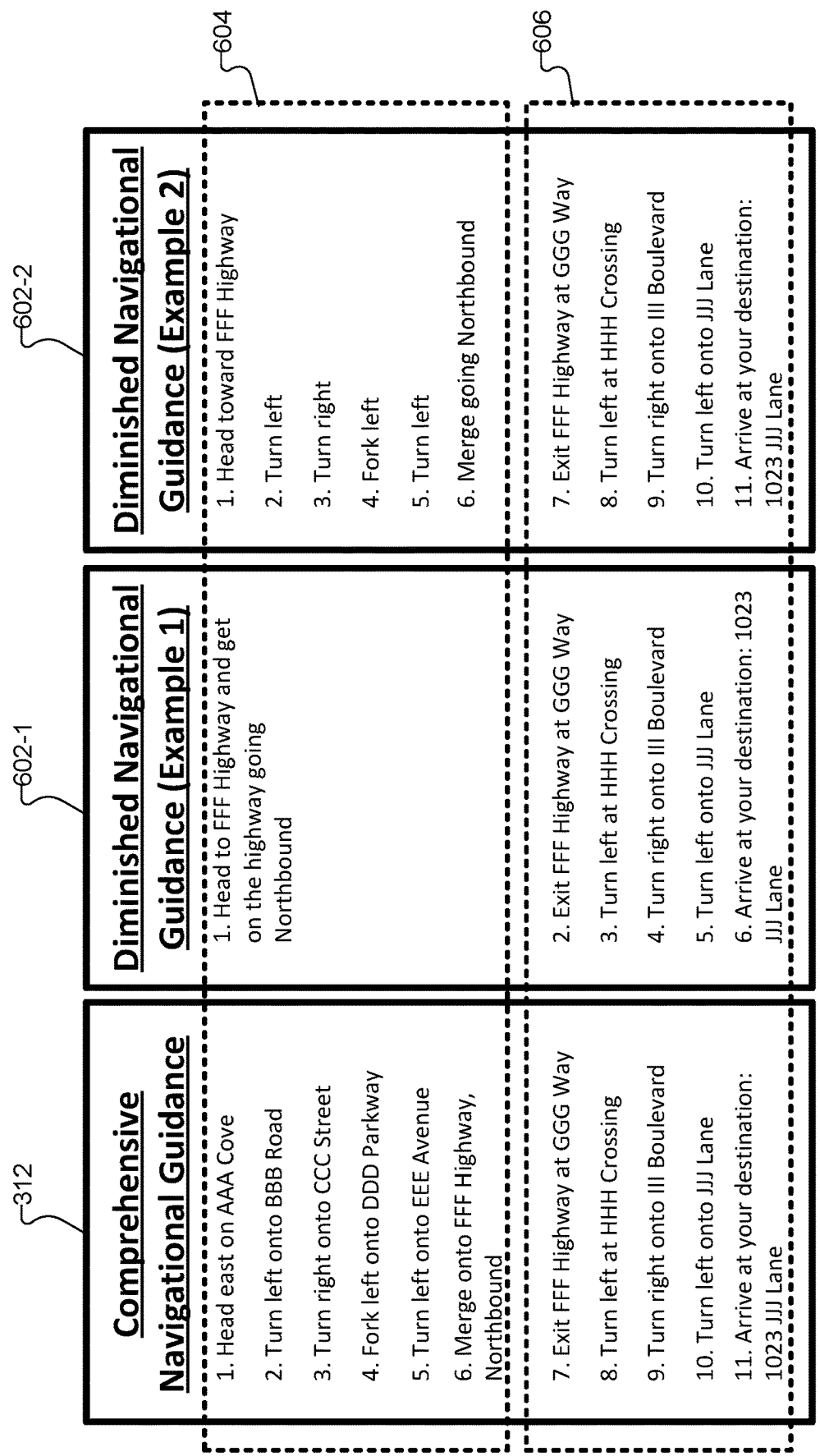
FIG. 6 illustrates the comprehensive navigational guidance of FIG. 3B together with examples of diminished navigational guidance that may be provided in different implementations according to principles described herein.

To illustrate, FIG. 6 shows a simplified depiction of comprehensive navigational guidance 312 (i.e., a depiction in which the respective distances for each of the instructions is omitted) alongside examples of possible diminished navigational guidance 602 (i.e., a first exemplary diminished navigational guidance 602-1 and a second exemplary diminished navigational guidance 602-2) that system 100 may provide in different implementations. As shown, comprehensive navigational guidance 312 includes the navigational guidance at the comprehensive guidance level described above in relation to FIG. 3B. In contrast, diminished navigational guidance 602-1 and 602-2 each include diminished guidance at different exemplary diminished guidance levels.

Because Instructions 1 through 6 of comprehensive navigational guidance 312 may relate, in the present example, to the domain of navigational proficiency of user 204, these instructions are outlined by a proficiency box 604 that will be understood to be associated with the domain of navigational proficiency. As shown, corresponding instructions in diminished navigational guidance 602-1 (i.e., Instruction 1) and in diminished navigational guidance 602-2 (i.e., Instructions 1 through 6) are also included in proficiency box 604. These instructions are similar to Instructions 1 through 6 in comprehensive navigational guidance 312 and will be understood to provide equivalent navigational guidance from location 302 onto Northbound FFF Highway. However, as shown, the instructions of proficiency box 604 included within diminished navigational guidance 602-1 and 602-2 are diminished from the corresponding instructions in comprehensive navigational guidance 312 in recognition of the fact that user 204 is proficient at navigating within the domain of navigational proficiency associated with proficiency box 604. These instructions will be described in more detail below.

Also shown in FIG. 6 is a non-proficiency box 606 that will be understood to be associated with geography external to the domain of navigational proficiency of user 204. Accordingly, as shown, the instructions in non-proficiency box 606 are the same instructions at the same comprehensive guidance level for comprehensive navigational guidance 312 and diminished navigational guidance 602-1 and 602-2. This is in recognition of the fact that user 204 is not necessarily proficient at navigating within the geography to which these instructions relate, and thus may desire full comprehensive guidance regardless of whether selective guidance is being provided.

As illustrated by the differences between diminished navigational guidance 602-1 and 602-2, diminished navigational guidance may be provided in various different ways in different implementations. As used herein, "diminished" navigational guidance (i.e., navigation guidance provided at a diminished guidance level) may not be associated with any absolute standard from implementation to implementation, but, rather, may be defined and recognized as being distinct from comprehensive navigational guidance (i.e., navigational guidance provided at a comprehensive guidance level). Specifically, diminished navigational guidance may include any suitable guidance that is distinguishably less detailed, inclusive, and/or conspicuous, than comprehensive navigational guidance being provided.

As one example, diminished navigational guidance may be implemented in certain embodiments by little or no navigational guidance. In such cases, for instance, the comprehensive guidance level may be associated with providing navigational guidance instructions to the user, while the diminished guidance level may be associated with abstaining from providing any navigational guidance instructions to the user or providing minimal navigational guidance instructions.

Diminished navigational guidance 602-1 is an example of this type of diminished navigational guidance. Rather than six turn-by-turn instructions guiding user 204 from starting location 302 to FFF Highway (which, according to the domain of navigational proficiency, the user needs minimal or no help navigating), diminished navigational guidance 602-1 includes just one instruction: "Head to FFF Highway and get on the highway going Northbound." If the domain of navigational proficiency has been properly defined, Instruction 1 of diminished navigational guidance 602-1 may be equally helpful to user 204 as Instructions 1-6 of comprehensive navigational guidance 312, but may be far less intrusive, interruptive, and/or annoying for user 204.

As another example, diminished navigational guidance may be implemented in certain embodiments by abbreviated, condensed, or otherwise simplified navigational guidance. In such cases, for instance, the comprehensive guidance level may be associated with providing navigational guidance instructions to the user at a first level of detail, while the diminished guidance level may be associated with providing navigational guidance instructions to the user at a second level of detail that is lower than the first level of detail.

Diminished navigational guidance 602-2 is an example of this type of diminished navigational guidance. Rather than six detailed turn-by-turn instructions (e.g., instruction that spell out the names of paths 306, the distances to be traversed on each path 306, etc.) to guide user 204 from starting location 302 to FFF Highway (which, according to the domain of navigational proficiency, the user needs minimal or no help navigating), diminished navigational guidance 602-2 provides six abbreviated instructions. Specifically, Instruction 1 indicates at the outset where user 204 is supposed to go: "Head toward FFF Highway," while each of Instructions 2 through 6 gently remind user 204 to turn (when provided at appropriate times). For example, as user travels on AAA Cove and comes up on BBB Road, Instruction 2 does not give the comprehensive instruction to "Turn left onto BBB Road" and to continue on BBB Road for 0.2 miles. Instead, Instruction 2 merely instructs user 204 to "Turn left." If the domain of navigational proficiency has been properly defined, the abbreviated Instructions 1 through 6 of diminished navigational guidance 602-2 may be equally helpful to user 204 as comprehensive Instructions 1 through 6 of comprehensive navigational guidance 312, but may be far less intrusive, interruptive, and/or annoying to user 204.

In still other examples, diminished navigational guidance may be implemented by navigational guidance provided in a different style, using a different volume level, or with another suitable distinction that renders the diminished navigational guidance different from, and less intrusive and potentially less disruptive than, the comprehensive navigational guidance. In such cases, for instance, diminished navigational guidance may involve only a non-verbal chime or a single word (e.g., "left," "right," "exit," etc.) provided at an appropriate time when an action is to be taken. As another example, diminished navigational guidance may be the same or similar to comprehensive navigational guidance in content, but may be provided at a lower volume than the comprehensive navigational guidance, may be provided without automatically pausing other competing audio (e.g., music, spoken word programming such as an audiobook, etc.), or may be otherwise provided in a less disruptive way than comprehensive navigational guidance. As another example, while comprehensive navigational guidance may provide multiple warnings to help user 204 prepare for a turn (e.g., "2 miles ahead on the route, exit right onto XYZ Street . . . in one quarter mile, exit right onto XYZ Street . . . use the right lane to exit onto XYZ Street in one hundred feet . . . take the exit onto XYZ Street"), diminished navigational guidance may provide fewer redundant instructions (e.g., one instruction to "exit right onto XYZ Street"). As yet another example, the level of formality of diminished navigational guidance may be markedly different from comprehensive navigational guidance. For instance, while comprehensive navigational guidance may be provided using a formal style (e.g., "Use the left lane to prepare to turn left onto University Boulevard/State Road 206 in 150 feet"), diminished navigational guidance may be provided using a less formal style (e.g., "Get ready to turn left onto University at the light").

FIG. 6 illustrates comprehensive and diminished guidance levels at which various forms of navigational guidance (e.g., textual guidance, graphical guidance, voice guidance, etc.) may be provided by mobile navigation device 202. In some examples, various forms of guidance may all match and be provided at the same guidance level. For instance, both textual guidance and voice guidance may use the diminished verbal instructions of diminished navigational guidance 602-1 or 602-2, while graphical guidance may likewise show less detail for diminished instructions than for comprehensive instructions. When user 204 begins the route in the example of diminished navigational guidance 602-1, for example, system 100 may provide graphical guidance that zooms out on the map to illustrate the current position of mobile navigation device 202 on AAA Cove as well as the entry point on FFF Highway to which user 204 is instructed to navigate (e.g., rather than zoomed in to show a detailed view of the left turn onto BBB Road that is to be the next action of user 204).

In other examples, various forms of guidance may not necessarily match or be provided at the same guidance level. For instance, in some implementations, voice guidance may be provided at a diminished guidance level for geography of the domain of navigational proficiency, while guidance given by way of other features (e.g., textual guidance, graphical guidance, etc.) may be provided at a comprehensive guidance level all the way from the starting location to the destination location. In this way, voice guidance may not interrupt a conversation or media content being listened to, but detailed instructions may still be available for viewing by the driver, by a passenger who is helping to navigate, or the like. In this way, the navigational guidance provided to user 204 may include both 1) voice guidance selectively provided at the comprehensive and diminished guidance levels, and 2) a non-audible type of guidance (e.g., textual guidance, graphical guidance, etc.) provided at the comprehensive guidance level between the starting location and the destination location.

As has been described, system 100 may automatically provide diminished navigational instructions when the user is traveling within a domain of navigational proficiency (e.g., for instructions within proficiency box 604 of diminished navigational guidance 602-1 and 602-2), and may automatically provide comprehensive navigational instructions otherwise (e.g., for instructions within non-proficiency box 606). Moreover, in the same or other examples, it will be understood that the guidance level may be dynamically changed or implemented manually or automatically with additional features that have not been explicitly mentioned.

As one example of such a feature, for instance, system 100 may be configured to notify user 204 that a "smart" guidance mode is being used that will provide only diminished navigational guidance at appropriate times. System 100 may present this notification before actually providing any instructions at the diminished guidance level. In such implementations, system 100 may prompt user 204 for user input granting permission to provide only the diminished navigational guidance, or may offer user 204 an opportunity to cancel this guidance mode and receive only comprehensive navigational guidance. Similarly, while mobile navigation device 202 is providing navigational guidance, system 100 may provide options for user 204 to manually suspend the smart guidance mode (e.g., by pushing a button, using a voice command, etc.) in case user 204 is receiving diminished instructions and wishes to instead receive comprehensive instructions. In some examples, user 204 may also find that he or she prefers the diminished style of guidance, and system 100 may offer a user-selectable option allowing user 204 to choose to always receive diminished navigational guidance even when outside of the geography of the domain of navigational proficiency.

As another example of a feature that system 100 may implement in certain embodiments, system 100 may include an auto-correction feature. For example, when user 204 is navigating within the domain of navigational proficiency, system 100 may be configured to automatically detect when user 204 deviates from an expected or preferred route. If the user takes an unexpected turn, for instance, system 100 may interpret this as an indication that the user is not as familiar with the area as had been assumed and may appreciate comprehensive navigational guidance after all. As such, system 100 may automatically provide comprehensive guidance instructions until user 204 is back onto the route and within geography that is included in the domain of navigational proficiency. In the same or other situations, if user 204 takes an unexpected turn on a path that user 204 has previously demonstrated familiarity with, system 100 may interpret this as an indication that an unexpected situation (e.g., road construction, an accident, a closed exit, etc.) may be interfering with the route that user 204 would normally take. Even if user 204 is navigating within geography included in the domain of navigational proficiency, system 100 may automatically begin providing comprehensive navigational guidance or prompt user 204 for input regarding whether user 204 wishes to receive comprehensive navigational guidance to help navigate the unexpected situation.

In certain examples, instead of or in addition to determining whether to provide comprehensive or diminished feedback based on user actions or user inputs in the ways described above, system 100 may determine which guidance level to use based on external information that is independent of user 204. For example, even when user 204 is navigating within geography of his or her domain of navigational proficiency, system 100 may determine that poor weather conditions, time of day conditions, or other road conditions may make navigation more difficult than it would be otherwise. For example, because user 204 may have more difficulty navigating even in familiar areas after dark or during a snow storm (e.g., due to poor visibility of street signs, etc.), system 100 may automatically provide comprehensive voice guidance even for paths within the domain of navigational proficiency for which system 100 would normally provide diminished voice guidance. Similarly, if system 100 determines that road conditions on the route are problematic (e.g., an avoidable traffic accident or traffic jam is ahead on the route), system 100 may automatically revert from providing diminished voice guidance to providing comprehensive voice guidance even if user 204 is navigating within the domain of navigational proficiency. In this way, system 100 may automatically assist user 204 in navigating around the undesirable road conditions by taking a modified route through the domain of navigational proficiency that may be less familiar to user 204.

As another example of a feature that system 100 may implement in certain embodiments, system 100 may include a local exception feature. For example, when user 204 is navigating from a starting location within the domain of navigational proficiency to a specific destination location that is also with the domain of navigational proficiency, system 100 may be configured to determine that user 204 may appreciate some degree of comprehensive navigational guidance to navigate to the destination. This is because a domain of navigational proficiency may include a zone of familiarity that user 204 has demonstrated proficiency at navigating the major paths, but that may still include details that user 204 is not intimately familiar with. In recognition of this, system 100 may automatically provide diminished navigational guidance for well-known geography (e.g., paths that user 204 has traveled on many times before) while providing comprehensive navigational guidance for hyper-local geography that may not be as familiar to the user even though technically falling within the domain of navigational proficiency (e.g., paths that user 204 has not traveled on before or as often).

Figure 7:
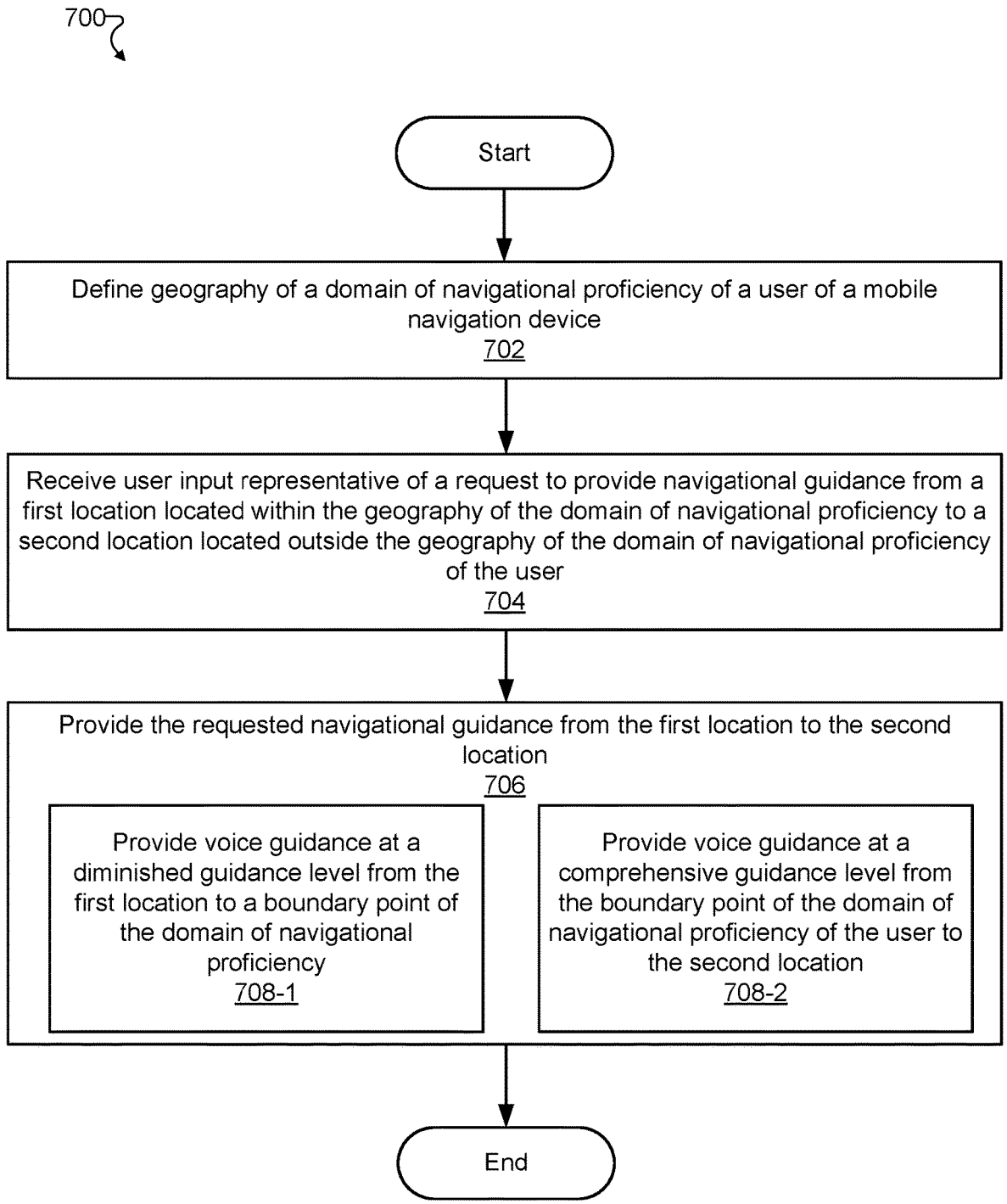
FIG. 7 illustrates an exemplary geospatial navigation method for providing selective voice guidance to a user of a mobile navigation device according to principles described herein.

FIG. 7 illustrates an exemplary method 700 for providing selective voice guidance to a user of a mobile navigation device. While FIG. 7 illustrates exemplary operations according to one embodiment, other embodiments may omit, add to, reorder, and/or modify any of the operations shown in FIG. 7. One or more of the operations shown in FIG. 7 may be performed by system 100, any components included therein, and/or any implementation thereof.

In operation 702, a geospatial navigation system may define geography of a domain of navigational proficiency of a user of a mobile navigation device. Operation 702 may be performed in any of the ways described herein.

In operation 704, the geospatial navigation system may receive user input from the user. In particular, the geospatial navigation system may receive user input representative of a request to provide navigational guidance from a first location to a second location. For example, the first location may be located within the geography of the domain of navigational proficiency of the user, while the second location may be located outside the geography of the domain of navigational proficiency of the user. Operation 704 may be performed in any of the ways described herein.

In operation 706, the geospatial navigation system may provide, the requested navigational guidance from the first location to the second location to the user. Operation 706 may be performed in any of the ways described herein. For example, the geospatial navigation system may provide navigational guidance by performing sub-operations 708-1 and 708-2. In sub-operation 708-1, the geospatial navigation system may provide voice guidance at a diminished guidance level from the first location to a boundary point of the domain of navigational proficiency of the user. In contrast, in sub-operation 708-2, the geospatial navigation system may provide voice guidance at a comprehensive guidance level from the boundary point of the domain of navigational proficiency of the user to the second location.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 8:
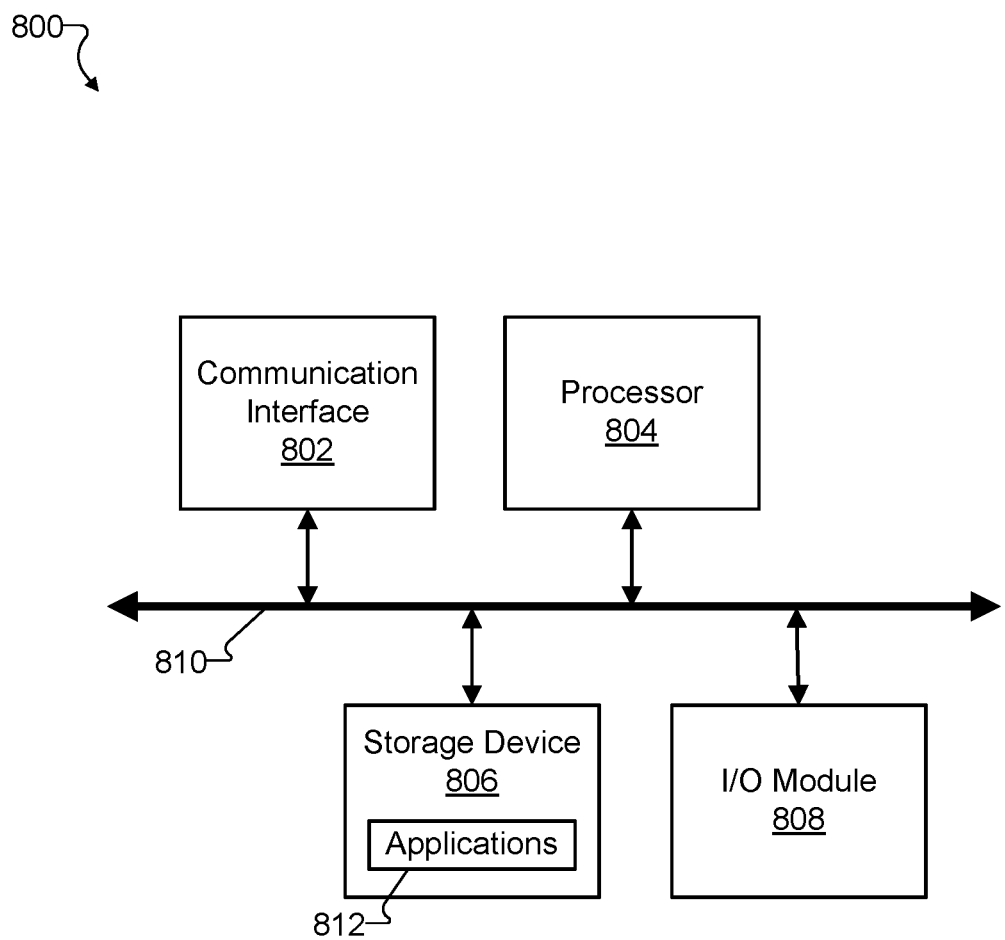
FIG. 8 illustrates an exemplary computing device according to principles described herein.

FIG. 8 illustrates an exemplary computing device 800 that may be specifically configured to perform one or more of the processes described herein. As shown in FIG. 8, computing device 800 may include a communication interface 802, a processor 804, a storage device 806, and an input/output ("I/O") module 808 communicatively connected one to another via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data and/or interpreting, executing, and/or directing execution of one or more of the instructions, processes, and/or operations described herein. Processor 804 may perform operations by executing computer-executable instructions 812 (e.g., an application, software, code, and/or other executable data instance) stored in storage device 806.

Storage device 806 may include one or more data storage media, devices, or configurations and may employ any type, form, and combination of data storage media and/or device. For example, storage device 806 may include, but is not limited to, any combination of the non-volatile media and/or volatile media described herein. Electronic data, including data described herein, may be temporarily and/or permanently stored in storage device 806. For example, data representative of computer-executable instructions 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 800. For example, storage facility 102 may be implemented by storage device 806, and processing facility 104 may be implemented by processor 804.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   defining, by a geospatial navigation system, geography of a domain of navigational proficiency of a user of a mobile navigation device;
   receiving, by the geospatial navigation system from the user, user input representative of a request to provide navigational guidance from a first location to a second location, the first location located within the geography of the domain of navigational proficiency of the user and the second location located outside the geography of the domain of navigational proficiency of the user; and
   providing, by the geospatial navigation system to the user, the requested navigational guidance from the first location to the second location, the navigational guidance including:
      first voice guidance provided from the first location to a boundary point of the domain of navigational proficiency of the user, the first voice guidance provided, without automatically pausing competing audio being presented to the user, at a diminished guidance level and at a first volume level,
      second voice guidance provided from the boundary point of the domain of navigational proficiency of the user to the second location, the second voice guidance provided, while automatically pausing the competing audio being presented to the user, at a comprehensive guidance level and at a second volume level higher than the first volume level, and
      non-audible textual guidance provided from the first location to the second location at the comprehensive guidance level such that comprehensive instructions are available to the user even when the voice guidance is provided at the diminished guidance level.

2. The method of claim 1, further comprising tracking the mobile navigation device during an extended time period as the user carries the mobile navigation device; and
   wherein the defining of the geography of the domain of navigational proficiency of the user is performed based on tracking data collected during the tracking of the mobile navigation device.

3. The method of claim 2, wherein the defining of the geography of the domain of navigational proficiency of the user includes:
   initializing, at an initial point in time, the geography of the domain of navigational proficiency; and
   repeatedly updating, subsequent to the initial point in time and during the extended time period, the initialized geography of the domain of navigational proficiency based on the tracking data.

4. The method of claim 1, wherein the geography of the domain of navigational proficiency includes:
   a contiguous zone of familiarity situated around a central user location; and
   an entirety of a path that intersects the zone of familiarity and extends beyond the zone of familiarity.

5. The method of claim 1, wherein:
   the comprehensive guidance level is associated with providing navigational guidance instructions to the user; and
   the diminished guidance level is associated with abstaining from providing navigational guidance instructions and instead providing a non-verbal chime or a single word to the user.

6. The method of claim 1, wherein:
the comprehensive guidance level is associated with providing navigational guidance instructions to the user at a first level of detail; and
the diminished guidance level is associated with providing navigational guidance instructions to the user at a second level of detail lower than the first level of detail.

7. The method of claim 1, further comprising:
providing, by the geospatial navigation system prior to the providing of the requested navigational guidance from the first location to the second location, a notification to the user that use of a smart guidance mode is available to provide the requested navigational guidance at a diminished guidance level; and
prompting the user, by the geospatial navigation system in connection with the notification, to provide input granting permission or canceling the use of the smart guidance mode.

8. A system comprising:
a memory storing instructions; and
a processor communicatively coupled to the memory and configured to execute the instructions to:
define geography of a domain of navigational proficiency of a user of a mobile navigation device;
receive, from the user, user input representative of a request to provide navigational guidance from a first location to a second location, the first location located within the geography of the domain of navigational proficiency of the user and the second location located outside the geography of the domain of navigational proficiency of the user; and
provide, to the user, the requested navigational guidance from the first location to the second location, the navigational guidance including:
first voice guidance provided from the first location to a boundary point of the domain of navigational proficiency of the user, the first voice guidance provided, without automatically pausing competing audio being presented to the user, at a diminished guidance level and at a first volume level,
second voice guidance provided from the boundary point of the domain of navigational proficiency of the user to the second location, the second voice guidance provided, while automatically pausing the competing audio being presented to the user, at a comprehensive guidance level and at a second volume level higher than the first volume level, and
non-audible textual guidance provided from the first location to the second location at the comprehensive guidance level such that comprehensive instructions are available to the user even when the voice guidance is provided at the diminished guidance level.

9. The system of claim 8, wherein the processor is further configured to execute the instructions to track the mobile navigation device during an extended time period as the user carries the mobile navigation device; and
wherein the defining of the geography of the domain of navigational proficiency of the user is performed based on tracking data collected during the tracking of the mobile navigation device.

10. The system of claim 9, wherein the defining of the geography of the domain of navigational proficiency of the user includes:
initializing, at an initial point in time, the geography of the domain of navigational proficiency; and
repeatedly updating, subsequent to the initial point in time and during the extended time period, the initialized geography of the domain of navigational proficiency based on the tracking data.

11. The system of claim 8, wherein the geography of the domain of navigational proficiency includes:
a contiguous zone of familiarity situated around a central user location; and
an entirety of a path that intersects the zone of familiarity and extends beyond the zone of familiarity.

12. The system of claim 8, wherein:
the comprehensive guidance level is associated with providing navigational guidance instructions to the user; and
the diminished guidance level is associated with abstaining from providing navigational guidance instructions and instead providing a non-verbal chime or a single word to the user.

13. The system of claim 8, wherein:
the comprehensive guidance level is associated with providing navigational guidance instructions to the user at a first level of detail; and
the diminished guidance level is associated with providing navigational guidance instructions to the user at a second level of detail lower than the first level of detail.

14. The system of claim 8, wherein the processor is further configured to execute the instructions to:
provide, prior to the providing of the requested navigational guidance from the first location to the second location, a notification to the user that use of a smart guidance mode is available to provide the requested navigational guidance at a diminished guidance level; and
prompt the user, in connection with the notification, to provide input granting permission or canceling the use of the smart guidance mode.

15. A non-transitory computer-readable medium storing instructions that, when executed, direct a processor of a computing device to:
define geography of a domain of navigational proficiency of a user of a mobile navigation device;
receive, from the user, user input representative of a request to provide navigational guidance from a first location to a second location, the first location located within the geography of the domain of navigational proficiency of the user and the second location located outside the geography of the domain of navigational proficiency of the user; and
provide, to the user, the requested navigational guidance from the first location to the second location, the navigational guidance including:
first voice guidance provided from between the first location to a boundary point of the domain of navigational proficiency of the user, the first voice guidance provided, without automatically pausing competing audio being presented to the user, at a diminished guidance level and at a first volume level,
second voice guidance provided from the boundary point of the domain of navigational proficiency of the user to the second location, the second voice guidance provided, while automatically pausing the competing audio being presented to the user, at a comprehensive guidance level and at a second volume level higher than the first volume level, and
non-audible textual guidance provided from the first location to the second location at the comprehensive guidance level such that comprehensive instructions are available to the user even when the voice guidance is provided at the diminished guidance level.

16. The non-transitory computer-readable medium of claim 15, the instructions further direct the processor to execute the instructions to track the mobile navigation device during an extended time period as the user carries the mobile navigation device; and
    wherein the defining of the geography of the domain of navigational proficiency of the user is performed based on tracking data collected during the tracking of the mobile navigation device.

17. The non-transitory computer-readable medium of claim 16, wherein the defining of the geography of the domain of navigational proficiency of the user includes:
    initializing, at an initial point in time, the geography of the domain of navigational proficiency; and
    repeatedly updating, subsequent to the initial point in time and during the extended time period, the initialized geography of the domain of navigational proficiency based on the tracking data.

18. The non-transitory computer-readable medium of claim 15, wherein:
    the comprehensive guidance level is associated with providing navigational guidance instructions to the user; and
    the diminished guidance level is associated with abstaining from providing navigational guidance instructions and instead providing a non-verbal chime or a single word to the user.

19. The non-transitory computer-readable medium of claim 15, wherein:
    the comprehensive guidance level is associated with providing navigational guidance instructions to the user at a first level of detail; and
    the diminished guidance level is associated with providing navigational guidance instructions to the user at a second level of detail lower than the first level of detail.

20. The non-transitory computer-readable medium of claim 15, wherein the instructions further direct the processor to:
    provide, prior to the providing of the requested navigational guidance from the first location to the second location, a notification to the user that use of a smart guidance mode is available to provide the requested navigational guidance at a diminished guidance level; and
    prompt the user, in connection with the notification, to provide input granting permission or canceling the use of the smart guidance mode.

* * * * *